United States Patent
Alvi et al.

(10) Patent No.: US 11,699,967 B2
(45) Date of Patent: Jul. 11, 2023

(54) ELECTRIC MACHINE WITH INTEGRATED POINT FIELD DETECTORS AND SYSTEM FOR MULTI-PARAMETER SENSING

(71) Applicant: GM GLOBAL TECHNOLOGY OPERATIONS LLC, Detroit, MI (US)

(72) Inventors: Muhammad H. Alvi, Troy, MI (US); Alireza Fatemi, Canton, MI (US); Suresh Gopalakrishnan, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 17/195,727

(22) Filed: Mar. 9, 2021

(65) Prior Publication Data
US 2022/0294376 A1    Sep. 15, 2022

(51) Int. Cl.
*H02P 21/10*    (2016.01)
*H02P 21/16*    (2016.01)
*H02P 21/18*    (2016.01)
*H02P 27/12*    (2006.01)
*H02P 21/22*    (2016.01)
*B60K 1/04*    (2019.01)

(52) U.S. Cl.
CPC .............. *H02P 21/10* (2013.01); *H02P 21/16* (2016.02); *H02P 21/18* (2016.02); *H02P 21/22* (2016.02); *H02P 27/12* (2013.01); *B60K 1/04* (2013.01)

(58) Field of Classification Search
USPC .................................................... 318/400.02
See application file for complete search history.

(56) References Cited

U.S. PATENT DOCUMENTS

| | | | |
|---|---|---|---|
| 6,100,618 A * | 8/2000 | Schoeb | F04D 5/001 310/90 |
| 10,432,130 B2 | 10/2019 | Namuduri et al. | |
| 10,666,099 B1 | 5/2020 | Fatemi et al. | |
| 10,854,933 B2 | 12/2020 | Hao et al. | |
| 10,923,287 B1 | 2/2021 | Coppola et al. | |
| 10,923,969 B2 | 2/2021 | Fatemi et al. | |
| 10,940,771 B1 | 3/2021 | Fatemi et al. | |
| 2019/0326842 A1 * | 10/2019 | Omekanda | H02K 7/20 |
| 2019/0357386 A1 | 11/2019 | Coppola et al. | |
| 2019/0363598 A1 | 11/2019 | Coppola et al. | |

(Continued)

FOREIGN PATENT DOCUMENTS

| | | | |
|---|---|---|---|
| DE | 102020203203 A1 * | 9/2021 | |
| EP | 1132709 B1 * | 11/2006 | G01D 5/145 |

(Continued)

OTHER PUBLICATIONS

U.S. Appl. No. 16/570,217, filed Sep. 13, 2019, Lahr et al.
(Continued)

*Primary Examiner* — Jorge L Carrasquillo (57) ABSTRACT

An electric machine disposed within a housing includes a stator, a rotor, and one or more point field detectors. The stator receives current from an inverter. The rotor is connected to and rotating a shaft based on a magnetic field generated by the stator. The one or more point field detectors are configured to detect leakage flux within the housing. The stator, the rotor and the one or more point field detectors are disposed within the housing.

20 Claims, 6 Drawing Sheets

(56) References Cited

U.S. PATENT DOCUMENTS

| | | | |
|---|---|---|---|
| 2020/0025247 A1* | 1/2020 | Miki | .................... H02K 49/108 |
| 2020/0103179 A1 | 4/2020 | Coppola et al. | |
| 2020/0161938 A1 | 5/2020 | Fatemi et al. | |
| 2020/0162005 A1 | 5/2020 | Fatemi et al. | |
| 2020/0195071 A1 | 6/2020 | Fatemi et al. | |
| 2021/0006115 A1 | 1/2021 | Nehl et al. | |
| 2021/0036643 A1 | 2/2021 | Wang et al. | |
| 2021/0040608 A1 | 2/2021 | Coppola et al. | |
| 2021/0044168 A1 | 2/2021 | Coppola et al. | |

FOREIGN PATENT DOCUMENTS

| | | | | |
|---|---|---|---|---|
| EP | 2758788 B1 * | 7/2019 | ............. | G01D 5/145 |
| JP | 3701207 B2 * | 9/2005 | ............ | B60L 15/025 |

OTHER PUBLICATIONS

U.S. Appl. No. 16/589,583, filed Oct. 1, 2019, Fatemi et al.
U.S. Appl. No. 16/662,862, filed Oct. 24, 2019, Coppola et al.
U.S. Appl. No. 16/671,732, filed Nov. 1, 2019, Samie et al.
U.S. Appl. No. 16/678,486, filed Nov. 8, 2019, Nehl et al.
U.S. Appl. No. 16/691,925, filed Nov. 22, 2019, Fatemi et al.
U.S. Appl. No. 16/701,528, filed Dec. 3, 2019, Coppola et al.
U.S. Appl. No. 16/701,640, filed Dec. 3, 2019, Coppola.
U.S. Appl. No. 16/701,693, filed Dec. 3, 2019, Coppola et al.
U.S. Appl. No. 16/710,772, filed Dec. 11, 2019, Liu et al.
U.S. Appl. No. 16/724,998, filed Dec. 23, 2019, Liu et al.
U.S. Appl. No. 16/736,185, filed Jan. 7, 2020, Yang et al.
U.S. Appl. No. 16/736,203, filed Jan. 7, 2020, Lahr et al.
U.S. Appl. No. 16/737,434, filed Jan. 8, 2020, Yang et al.
U.S. Appl. No. 16/774,696, filed Jan. 28, 2020, Gopalakrishnan et al.
U.S. Appl. No. 16/780,308, filed Feb. 3, 2020, Hao et al.
U.S. Appl. No. 16/782,681, filed Feb. 5, 2020, Nehl et al.
U.S. Appl. No. 16/800,625, filed Feb. 25, 2020, Coppola et al.
U.S. Appl. No. 16/860,692, filed Apr. 28, 2020, Yang et al.
U.S. Appl. No. 16/860,695, filed Apr. 28, 2020, Yang et al.
U.S. Appl. No. 16/944,578, filed Jul. 31, 2020, Fatemi et al.
U.S. Appl. No. 17/004,801, filed Aug. 27, 2020, Lee et al.
U.S. Appl. No. 17/078,466, filed Oct. 23, 2020, Yang.
U.S. Appl. No. 17/078,790, filed Oct. 23, 2020, Coppola et al.
U.S. Appl. No. 17/082,555, filed Oct. 28, 2020, Coppola et al.
U.S. Appl. No. 17/084,181, filed Oct. 29, 2020, Coppola et al.

* cited by examiner

ELECTRIC MACHINE WITH INTEGRATED POINT FIELD DETECTORS AND SYSTEM FOR MULTI-PARAMETER SENSING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems for detecting states of electric motors of a propulsion system of a vehicle.

A propulsion system of a vehicle may include one or more electric motors. Each electric motor may be used to drive one or more axles and/or one or more wheels of the vehicle. As an example, an electric motor may be used to drive an axle of the vehicle via a differential. A controller, based on a torque request, may signal the electric motor to rotate an input gear of the differential and as a result, the wheels attached to the axle. The controller may adjust current, voltage and/or power levels of the electric motor to control acceleration, deceleration and/or speed of the vehicle.

SUMMARY

An electric machine disposed within a housing is provided and includes a stator, a rotor, and one or more point field detectors. The stator receives current from an inverter. The rotor is connected to and rotating a shaft based on a magnetic field generated by the stator. The one or more point field detectors are configured to detect leakage flux within the housing. The stator, the rotor and the one or more point field detectors are disposed within the housing.

In other features, the one or more point field detectors are disposed on the rotor.

In other features, the one or more point field detectors are disposed on the stator.

In other features, the one or more point field detectors are disposed radially outward of the stator and radially inward of the housing.

In other features, the one or more point field detectors are disposed on a radial outer surface of the stator.

In other features, the one or more point field detectors are disposed on a radial inner surface of the housing.

In other features, the one or more point field detectors are embedded in a dielectric material. The dielectric material is disposed between the stator and the housing.

In other features, the one or more point field detectors include semiconductor chip scale devices.

In other features, the one or more point field detectors include a Hall Effect sensor that is galvanically isolated.

In other features, the one or more point field detectors includes a magnetoresistive sensor that is galvanically isolated.

In other features, a propulsion system is provided and includes the electric machine and a first control module. The first control module is configured to determine one or more parameters based on the leakage flux. The one or more parameters include at least one of a current level, a rotor position, a temperature, or a magnetization state.

In other features, the first control module is configured to determine the current level based on the leakage flux.

In other features, the first control module is configured to determine the rotor position based on the leakage flux.

In other features, the first control module is configured to determine the temperature based on the leakage flux.

In other features, the first control module is configured to determine the magnetization state based on the leakage flux.

In other features, the one or more point field detectors includes at least three point field detectors. The first control module is configured to determine the current level, the rotor position, the temperature, and the magnetization state based on outputs of the three point field detectors.

In other features, the propulsion system further includes current sensors, a summer, a first converter, and a second converter. The current sensors are configured to detect current respectively for three phases of the electric machine. The summer is configured to determine a difference between the leakage flux and an expected amount of leakage flux. The first converter is configured to convert the difference to the rotor position. The second converter is configured to determine the expected amount of leakage flux based on the rotor position and current signal outputs of the current sensors.

In other features, the propulsion system further includes a position sensors, a summer, a converter, and a rotor saliency corrector module. The position sensor is configured to detect a position of at least one of the shaft or the rotor. The summer is configured to determine a difference between the leakage flux and an expected amount of leakage flux. The converter is configured to convert the difference to a d-q current signal. The rotor saliency corrector module is configured to determine the expected amount of leakage flux (i) based on the d-q current signal and the position of the at least one of the shaft or the rotor, and (ii) while compensating for at least one of different reluctances of d and q axes of the electric machine, different magnetic fields associated with the d and q axes, or differences in d and q current levels.

In other features, the propulsion system further includes a sensor. The sensor is separate from the electric machine and configured to detect (i) a position of the shaft, or (ii) the current level, which is an amount of current passing through a phase of the electric machine. The first control module is configured to, based on the leakage flux, determine the at least one of the position of the shaft or the current level of the phase of the electric machine as a redundancy check to verify output of the sensor.

In other features, the propulsion system further includes a second control module configured to perform at least one of diagnostics or prognostics of the electric machine based on the leakage flux.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A propulsion system of a vehicle that includes one or more electric motors can require current and rotor position detection for torque control. Input current levels of the motors and positions of the rotors are used to generate and orient current complex space vectors for setting output torque levels of the motors. Torque control can also require a time derivative of rotor position (i.e. speed of the rotor) in order to set input current levels of the motors for maximum torque per ampere (MTPA) and field weakening operation. Accurate current levels and rotor position is needed for accurately setting motor torque and power output levels.

A propulsion system of a vehicle may include various sensors for detecting states of one or more electric motors (e.g., one or more interior permanent magnet (IPM) motors). The sensors may include Hall Effect sensors for detecting current levels of phases of the electric motors, temperature sensors for detecting temperatures of the electric motors, and resolvers (e.g., reluctance resolvers) for detecting positions of the rotors of the electric motors. As an example, three Hall Effect sensors may be disposed on current lines extending from an inverter to a corresponding IPM motor to detect levels of input current of the three phases of the IPM motor. A resolver may be disposed in the IPM motor, attached to the IPM motor or indirectly attached to the IPM motor via a shaft and/or other coupling member(s). The resolver needs to be mounted on a shaft either internal or external to the IPM motor. The Hall Effect sensors and the resolver can be costly and bulky, which can be an impediment to achieving power density targets. The resolver can also, depending on where it is implemented, be exposed to automatic transmission fluid (ATF) and thus needs certain types of electrical connections that can be exposed to ATF and not experience electrical shorts. As an example, the temperature sensors may include thermocouples and/or other types of temperature sensors.

The examples set forth herein include motors with point field detectors (PFDs) for detecting leakage flux within housings of the motors. The PFDs are implemented within the housings and include low cost, lightweight, magnetoresistive and/or Hall Effect sensing hardware. The PFDs do not include moving parts and/or magnetic cores and extract information from existing electromagnetic fields. Multiple electric machine parameters are determined based on output signals from the PFDs. Motor control, diagnostic and/or prognostic operations are performed based on the determined parameters.

Figure 1:
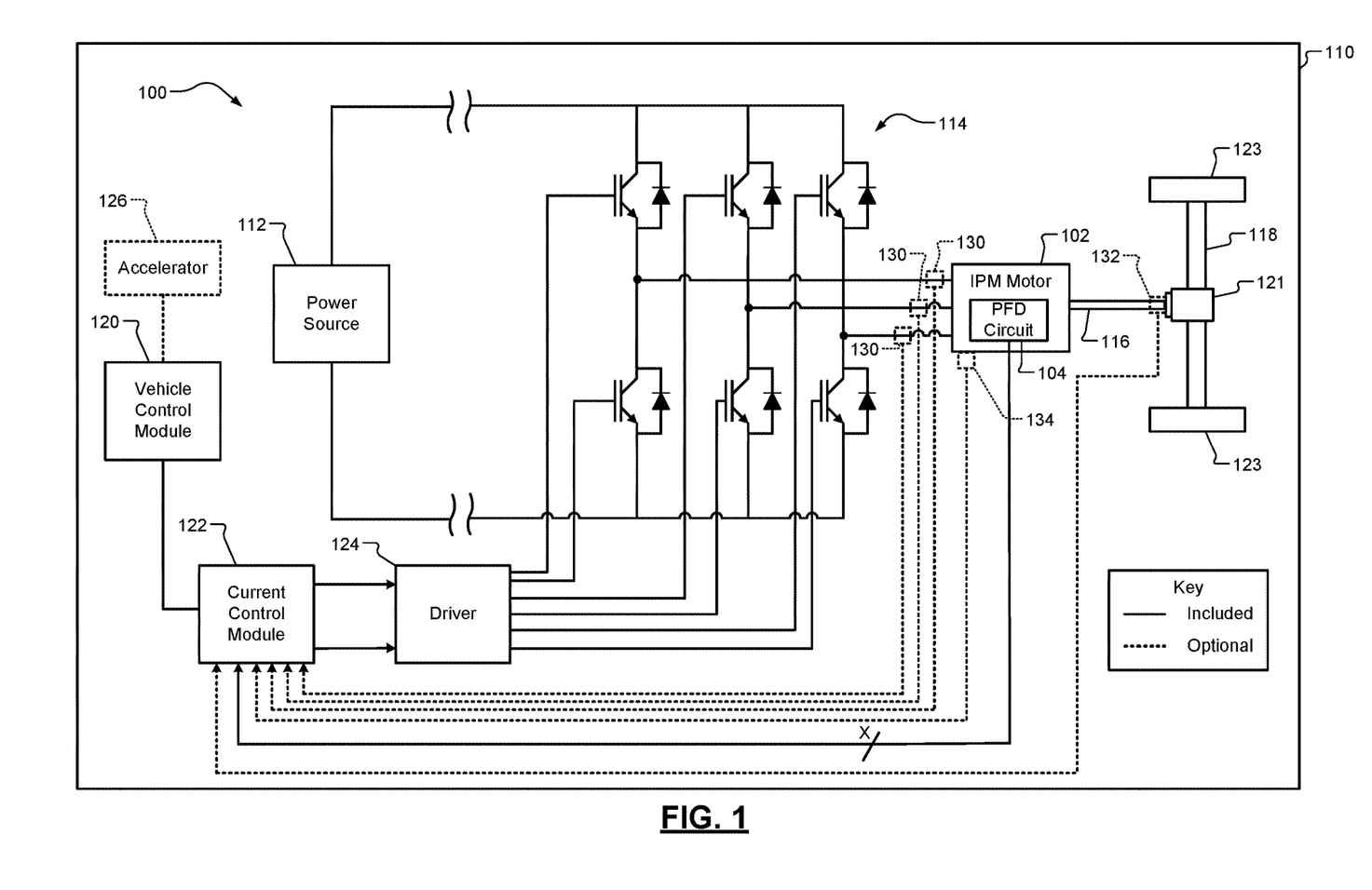
FIG. 1 is a functional block diagram and schematic of an example propulsion system including a motor with a point field detector (PFD) circuit in accordance with the present disclosure.

FIG. 1 shows an example propulsion system 100 including a motor 102 with a point field detector (PFD) circuit 104. Although the motor 102 is shown as an IPM motor, the motor 102 may be a surface permanent magnet motor or other type of electric motor. Although various examples are disclosed herein with respect to a motor, the examples are applicable to other electric machines. For example, the PFDs disclosed herein may be implemented in a generator or other electric machine and various information as disclosed herein may be extracted from the outputs of the PFDs.

Figure 2:
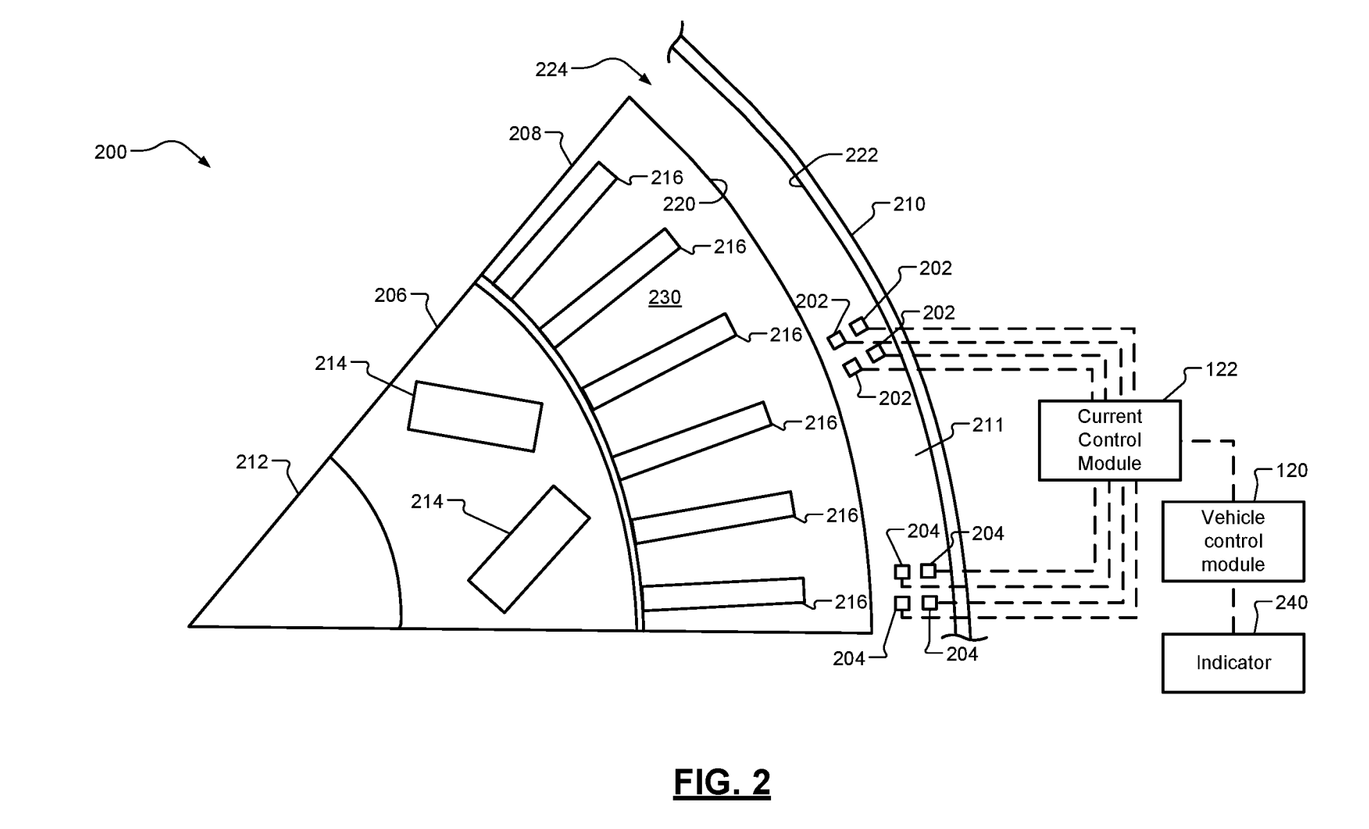
FIG. 2 is a cross-sectional view of an example portion of a motor illustrating inclusion of point field detectors (PFDs) in accordance with the present disclosure.

The PFD circuit 104 may be attached to and included in, for example, at least a portion of a housing of the motor 102. The PFD circuit 104 may include one or more PFDs. Examples of the PFDs are shown in FIG. 2. The PFDs may refer to devices configured to detect leakage flux and/or magnetic fields. The leakage flux may refer to magnetic flux that does not follow a particular intended path in a magnetic circuit and is not used for work. Leakage flux may be stator leakage flux and/or rotor leakage flux. The PFDs may include Hall Effect sensors, magnetoresistive sensors, anisotropic magnetoresistive (AMR) sensors, tunnel magnetoresistive sensors, and giant magnetoresistive sensors. In one embodiment, the PFDs are semiconductor chip scale sensors configured to be disposed within the housing of the motor 102. The PFDs may include (i) one-dimensional PFDs, each of which used to measure radial or tangential leakage flux, and/or (ii) two-dimensional PFDs, each of which used to measure radial and tangential leakage flux. Each of the two-dimensional PFDs may include two one-dimensional PFDs.

The propulsion system 100 may be used to drive a vehicle 110 and further include a power source 112 (e.g., a battery pack), an inverter 114, a shaft 116, an axle 118 including a differential 121 and wheels 123. The inverter 114 converts a direct current (DC) voltage to a three phase alternating current (AC) to power the motor 102. The motor 102 drives the shaft 116, which in turn drives the axle 118.

The propulsion system 100 further includes a vehicle control module 120, a current control module 122 and a driver 124. The vehicle control module 120 may generate a torque request signal. The torque request signal may be generated based on torque commanded, for example, by an accelerator 126 if included. The current control module 122 may control the driver 124 based on the torque request signal. The driver 124 may, for example, generate pulse width modulation (PWM) signals to control states of transistors of the invertor 114 based on output of the current control module 122.

The current control module 122 controls the driver 124 based on outputs from sensors. The sensors may include current sensors (e.g., Hall Effect sensors 130), a resolver 132, a temperature sensor 134, and/or the PFDs of the PFD circuit 104. The current sensors may include sensors other than Hall Effect sensors. The current control module 122 receives leakage flux current signals from the PFDs. The PFD signals may be provided, for example, by one or more signal lines. X signal lines are shown. Each of the PFDs may include one or more signal lines. Each two dimensional PFD may include two signal lines. Also, signals from the PFDs may be differential signals, which include two lines per signal. Information on the signal lines may be monitored and/or extracted including voltages, current levels, maximum and minimum voltages, maximum and minimum current levels, frequencies, duty cycles, etc. and be used to determine leakage flux and other parameters.

The current control module performs a transformation of current phase signals Ia, Ib and Ic for the three phases of the motor to current vector signals Id and Iq. The current control module 122 determines how much current is flowing and how much current is needed (or requested) and modifies input current levels of the motor 102 by adjusting output current vector voltage signals supplied to the driver 124. This is based on (i) the current vector signals Id, Iq, (ii) the PFD signals, (iii) the position signal out of the resolver 132, and (iv) the torque request signal from the vehicle control module 120.

The PFDs may be used to replace one or more of the sensors 130, 132, 134 and/or for redundancy purposes. The PFDs may be used to backup and/or verify outputs of the sensors 130, 132, 134. The PFDs measure flux leakage current, which includes information indicative of: (i) current levels of the stator of the motor 102; (ii) position of the rotor of the motor 102; (iii) temperature of the motor 102 and/or a component thereof, such as the rotor of the motor 102; and (iv) magnetization state of the motor 102. The magnetization state of the motor 102 refers to the magnetization states of magnets of the motor 102.

In one embodiment, the sensors 130, 132, 134 and the PFDs are included. The PFDs may be used for redundancy purposes to provide the same or similar information provided by the sensors 130, 132, 134. The information provided by the sensors 130, 132, 134 may be derived from the signals generated by the PFDs. Table 1 shows information that may be collected from and/or derived from outputs of the sensors 130, 132, 134 and PFDs.

TABLE 1

Parameters sensed and corresponding possible sensors.

| Parameters to be Sensed | Sensor/Source of Information Other Than PFDs | Use of PFDs |
| --- | --- | --- |
| Current (Iabc → Iαβ → Idq) | Hall Effect or Other Current Sensors | Replacement of one or more other sensors (e.g., Hall Effect current sensors, reluctance resolver, and/or thermocouple) with PFD(s) |
| Rotor Position to Angular Frequency (or Speed) (θ → ω) | Reluctance Resolver or Other Position Sensor | |
| Rotor Magnetization | Estimation Based on Other Sensors | |
| Temperature | Thermocouple | |

Leakage flux φ measured via each of the PFDs is equal to a function of permanent magnet flux $j_m$ at the PFD location, a current vector Idq of the stator of the motor, rotor position θ of the motor, and permeability μ of ferromagnetic materials of the motor, as represented by equation 1. The permanent magnet flux $j_m$ is equal to a function of the rotor position θ, a temperature T of the rotor, and a magnetization state $J_e$ of the motor, as represented by equation 2. The permeability μ is equal to a function of the current vector Idq, the rotor position θ, and temperature T as represented by equation 3. The permeability μ is also equal to magnet flux density B divided by magnet field density H.

$$\phi = F\{j_m, Idq, \theta, \mu\} \quad (1)$$

$$j_m = F\{\theta, T, J_e\} \quad (2)$$

$$\mu = F\{Idq, \theta, T\} \quad (3)$$

Substituting equations 2 and 3 into equation 1 provides equation 4, wherein the leakage flux φ at a PFD is equal to a function of the rotor position θ, the temperature T of the rotor, the magnetization state $J_e$, and the current vector Idq.

$$\phi = F\{\theta, T, J_e, Idq\} \quad (4)$$

The leakage flux φ may be measured by any number of PFDs and has characteristics that are indicative of other parameters, such as the rotor position θ, temperature T, magnetization state $J_e$ and current vector Idq. The rotor position θ may be measured by a resolver and/or using (i) two or more single dimension PFDs, or (ii) one or more dual dimension PFDs. The current vector Idq may be determined based on a resolver and (i) outputs of three current sensors (e.g., Hall Effect sensors) attached to current lines extending between the inverter and the motor, (ii) outputs from three or more single dimension PFDs, and/or (iii) outputs from two or more dual dimension PFDs. The rotor temperature T may be determined (i) via a thermocouple (or other temperature sensor), and/or (ii) based on an output from one or more PFDs. The magnetization state $J_e$ may be estimated based on (i) outputs of current sensors and rotor position, and/or (ii) outputs of one or more PFDs. The magnetization state $J_e$ may be used to estimate rotor temperature.

Each of the PFDs 202, 204 and/or other PFDs referred to herein may be single or dual direction PFDs. Each of the single direction PFDs may be used to detect magnetic fields and leakage flux in X or Y directions. Each dual direction PFDs may be used to detect magnetic fields and leakage flux in both the X and Y directions. The X and Y directions may refer to radial and tangential directions in a cylindrical coordinate system.

Any one of the parameters of leakage flux, rotor position, current vector, rotor temperature and magnetization state can be determined based on the other four parameters. This enables the removal of one of, for example, the current sensors or resolver, and in replacement, inclusion of one or more PFDs. As an example, each current sensor and/or resolver may be replaced with one or more PFDs. In one embodiment, the current sensors are replaced with PFDs. The PFDs and the resolver are used to estimate current through the stator. In another embodiment, the resolver is replaced with one or more PFDs and rotor position is estimated based on outputs of the PFDs.

When multiple sets of PFDs are included to provide a sufficient degree of freedom and uniqueness of information, the current sensors and the resolver may be eliminated. As an example, 6-7 PFDs may be included to measure leakage flux and estimate rotor position, rotor speed, current levels (or current vector), rotor temperature and/or magnetization state of the motor. Rotor speed may be determined based on rotor position.

FIG. 2 shows a portion 200 of a motor (e.g., the motor 102 of FIG. 1) illustrating inclusion of sets (or arrays) of point field detectors (PFDs) 202, 204. The portion 200 may be associated with a single pole of a multi-pole motor. Although a motor is shown, the PFDs 202, 204 may be similarly implemented on other electric machines. The motor includes a rotor 206 and a stator 208 and may include a housing 210. The housing 210 may be the housing of the motor and/or an electric machine assembly or may be a housing of another device, such as a transmission, where the motor (or electric machine) is disposed in the housing of the other device. In one embodiment, the motor is disposed in the housing of a transmission. The motor (or electric machine) may be disposed within a housing of another device without having a dedicated housing enclosing only the motor (or electric machine). The rotor 206 is attached to and rotates a shaft 212. Although two sets of PFDs are shown, any number of sets of PFDs may be included. Each set of PFDs may include one or more PFDs. The rotor includes magnets (e.g., magnets 214). The stator 208 includes stator windings (or conductors) 216. Any number of sets (or arrays) of PFDs may be included within the housing 210.

Although the two sets of PFDs are shown as being disposed outside the stator 208, the PFDs may be located elsewhere, such as on the rotor 206 and/or the stator 208. The PFDs may be arranged in rows and/or columns. In one embodiment, the PFDs are arranged in a ring pattern disposed circumferentially around the stator 208. In the example shown, the PFDs are disposed between the stator 208 and the housing 210. The PFDs may be attached to an outer peripheral surface 220 of the stator 208 or to an inner surface 222 of the housing 210. The PFDs may be disposed on or outside portions of the motor corresponding respectively to one or more poles of the motor. As an example, the motor may have 2, 4, 8, 16, etc. poles and the PFDs may be disposed on or radially outside of the portions of the motor corresponding to the poles. The PFDs may be disposed in a space 224 between the stator and the housing 210, as shown. In yet another embodiment, the PFDs are disposed within a predetermined distance (e.g., 2-3 milli-meters (mm)) of the outer peripheral surface 220 of the stator 208.

In one embodiment, leakage magnetic flux (or leakage flux) is detected radially outside of the core 230 of the stator 208 using integrated PFDs. Parameters such as current levels, rotor position, rotor velocity (or speed), and rotor magnetization state may be derived and/or estimated based on outputs of the PFDs. The leakage flux exists naturally in operating motors and contains cross-coupled information of rotor and stator parameters. The PFDs, as stated above, may be chip-scale sensors that are inexpensive, small in size and weight, and have no moving parts. The PFDs are disposed within the housing 210 and are not exposed to a liquid, such as automatic transmission fluid and thus do not need certain electrical connections suitable for such an environment. The housing 210 may be electrically grounded and/or connected to a ground reference.

Outputs of the PFDs may be provided to an analog hardware circuit and/or directly to the current control module 122. The analog hardware circuit may be (i) connected between the PFDs and the current control module 122, and (ii) filter, signal process, and/or determine one or more parameters based on the outputs of the PFDs. The analog hardware circuit may be part of or separate from the current control module 122. The analog hardware circuit and/or the current control module 122 may be implemented as a circuit that is disposed on and/or attached to the housing 210. The analog hardware circuit and/or the current control module 122 may be implemented separate from the motor and thus separate from the housing 210. The attachment to the housing 210 and/or external implementation of the analog hardware circuit and the current control module 122 provides easy access to hardware controlling operation of the motor. The analog hardware circuit and/or the current control module 122 may be implemented in a protective housing and not be exposed to a fluid, such as an automatic transmission fluid.

The PFDs may be isolated as shown in FIG. 2 and allow for control, diagnostics, and prognostics of the motor to be performed. In another embodiment, the PFDs are stationary and perform leakage flux sensing. In one embodiment there is a dielectric material 211 disposed between the stator 208 and the PFDs, such that there is full galvanic isolation of the PFDs. The PFDs may be disposed at least partially in and/or be surrounded by the dielectric material 211. The PFDs are isolated from conductors of the stator 208, the rotor 206 and an inverter (e.g., the inverter 114 of FIG. 1) of the motor.

The control, diagnostics and prognostics may be implemented by the current control module 122 and/or the vehicle control module 120. The current control module 122 may control the current and voltage levels, the torque output and the speed of the motor based on the information collected from and/or derived from the outputs of the sensors 130, 132, 134 of FIG. 1 and/or the PFDs (e.g., the PFDs 202, 204 of FIG. 2). The current control module 122 may perform diagnostic and/or prognostic operations to detect and identify degradation, an operating irregularity, and/or a failure of the motor. This is accomplished based on the outputs of the PFDs and/or outputs of other sensors, such as the sensors 130, 132, 134 of FIG. 1. The vehicle control module 120 may perform countermeasures in response to results of the diagnostics and prognostic operations, such as generate a visual or audible indication signal of states of the motor via an indicator 240, limit speed of the motor, limit operation of the motor for more than a predetermined period of time, reduce speed of the motor to a predetermined speed or to zero, and/or perform some other countermeasure. The indicator 240 may be a display, an audio device, a transmitter for wireless transmission of the information to a remote device, and/or other indicator.

Figure 3:
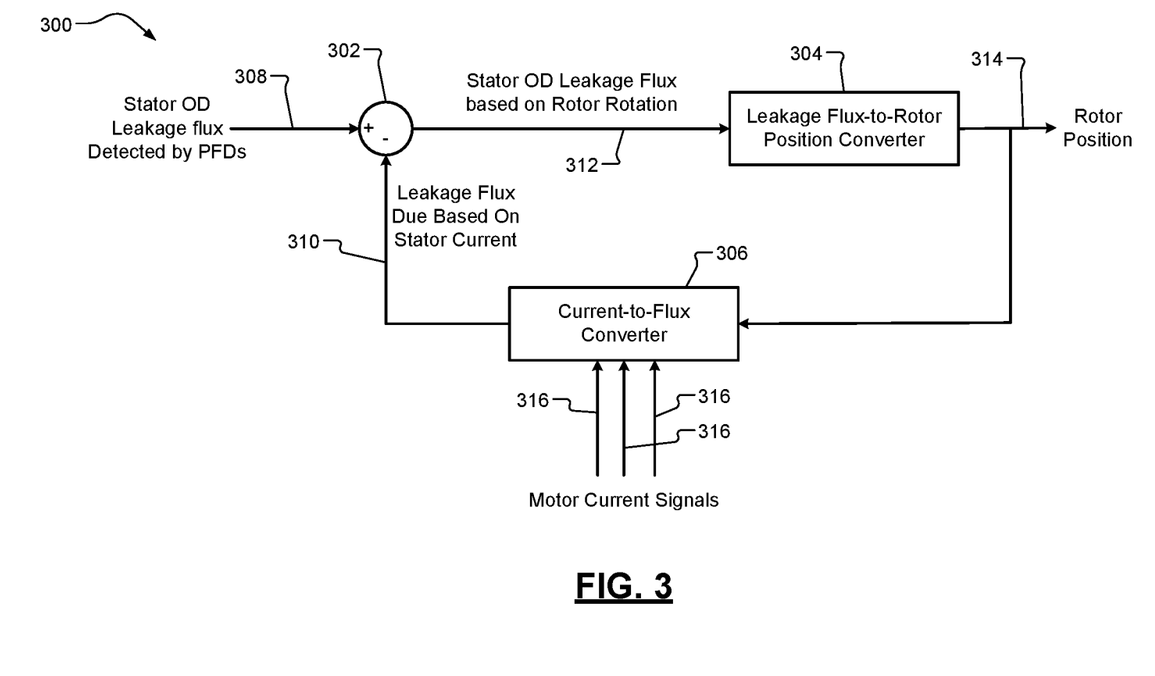
FIG. 3 is a signal diagram of an example feedback system for determining rotor position based on leakage flux detected by PFDs in accordance with the present disclosure.

FIG. 3 shows an exemplary feedback system 300 for determining rotor position based on leakage flux detected by PFDs. The feedback system 300 may be performed by the current control module 122 and/or the vehicle control module 120 of FIGS. 1-2. The feedback system 300 may include a summer 302, a leakage flux-to-rotor position converter 304 and a current-to-flux converter 306. The summer 302 may determine a difference 312 between (i) an amount of leakage flux 308 detected by PFDs and (ii) an expected amount of leakage flux 310 based on an amount of stator current. The leakage flux 308 may be at or near a stator outer diameter (OD) and include radial and tangential components of magnet flux densities Br, Bt.

As an example, the PFDs may be disposed on an outside of a stator as shown in FIG. 2. The difference 312 may refer to the stator OD leakage flux (or amount of leakage flux measured at or near the OD of the stator) and be based on rotor rotation.

The leakage flux-to-rotor position converter 304 may determine a rotor position 314 based on the difference 312 provided by the summer 302. The current-to-flux converter 306 may determine the leakage flux 310 expected based on the stator current. The current-to-flux converter 306 may (i) determine the current vector Idq (or current vectors Id and Iq) based on the rotor position 314 and motor current signals 316, and then (ii) determine the expected leakage flux 310 based on the current vector Idq. The motor current signals may include Ia, Ib, and Ic current signals for the three phases of the motor. The motor current signals may be generated by the above-stated current sensors. The current-to-flux converter 306 may be used for load decoupling purposes and for current observer calibration and conditioning purposes.

The feedback system 300 may (i) receive or detect a net leakage flux at or near an OD of the stator using a two-dimensional PFD, (ii) separate the net cross-coupled leakage flux into rotor and stator components using information from current sensors, (iii) separate the rotor leakage flux into tangential and radial components, and (iv) use arctangent (or inverse tangent) and/or observer based methods to obtain an absolute rotor position. As an example, the leakage flux-to-rotor position converter 304 may take the arctangent of a radial signal (or leakage flux radial component) divided by a tangential signal (or leakage flux tangential component) to determine an angle, which is indicative of the rotor position.

Figure 4:
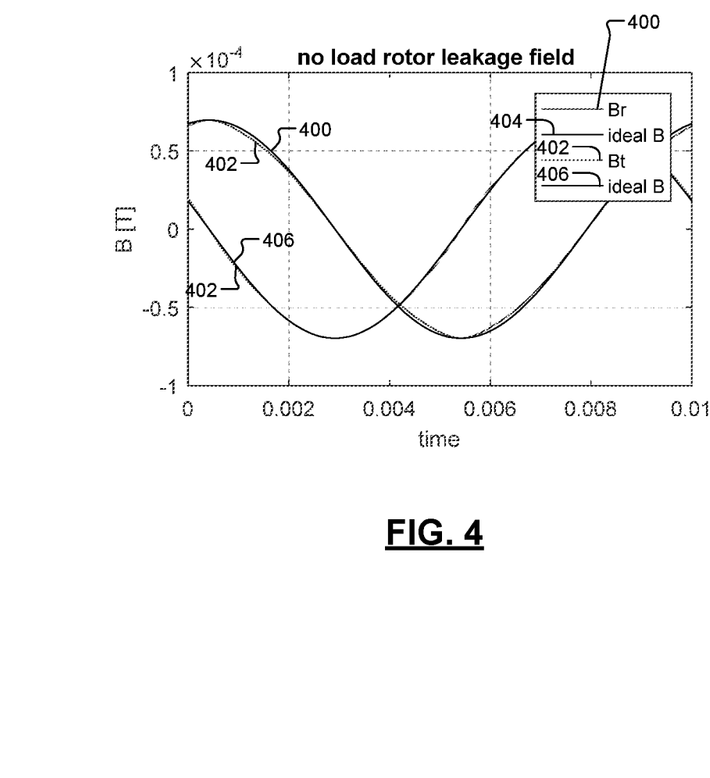
FIG. 4 is an example simulation plot of leakage flux relative to time as detected by one or more PFDs.
Figure 5:
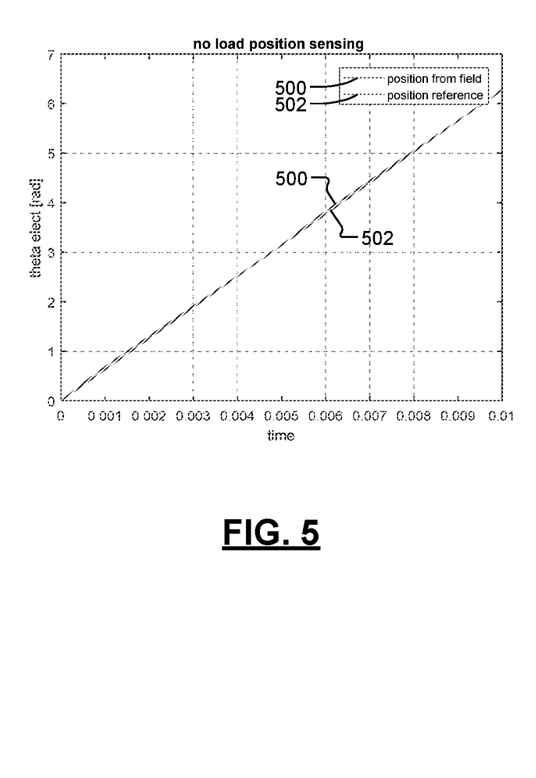
FIG. 5 is an example simulation plot of rotor position versus time corresponding to the leakage flux of FIG. 4 using the feedback system of FIG. 3.

FIG. 4 shows a simulation plot of leakage flux relative to time as detected by one or more PFDs. FIG. 4 is an example of a no load case, where zero current is flowing through the stator of the motor. The plot includes radial and tangential magnetic flux density curves 400, 402 and corresponding ideal curves 404, 406. Different sinusoidal curves than that shown in FIG. 4 would be provided for a situation where load is applied and current to stator is increased. In the simulation performed, radial and tangential leakage fields are captured in finite element analysis (FEA) and plotted after performing amplitude scaling. An arctangent method may be used to extract rotor position information from the radial and tangential field. This is shown in FIG. 5, which includes a simulation plot of rotor position versus time corresponding to the leakage flux of FIG. 4 and using the feedback system of FIG. 3. FIG. 5 includes a rotor position curve 500 and a position reference curve 502. The non-ideality of the fields leads to errors of less than 1° mechanical. The plots of FIGS. 4-5 are provided as an example to illustrate that leakage flux exists outside of a stator and is within a range that is detectable by a PFD.

Figure 6:
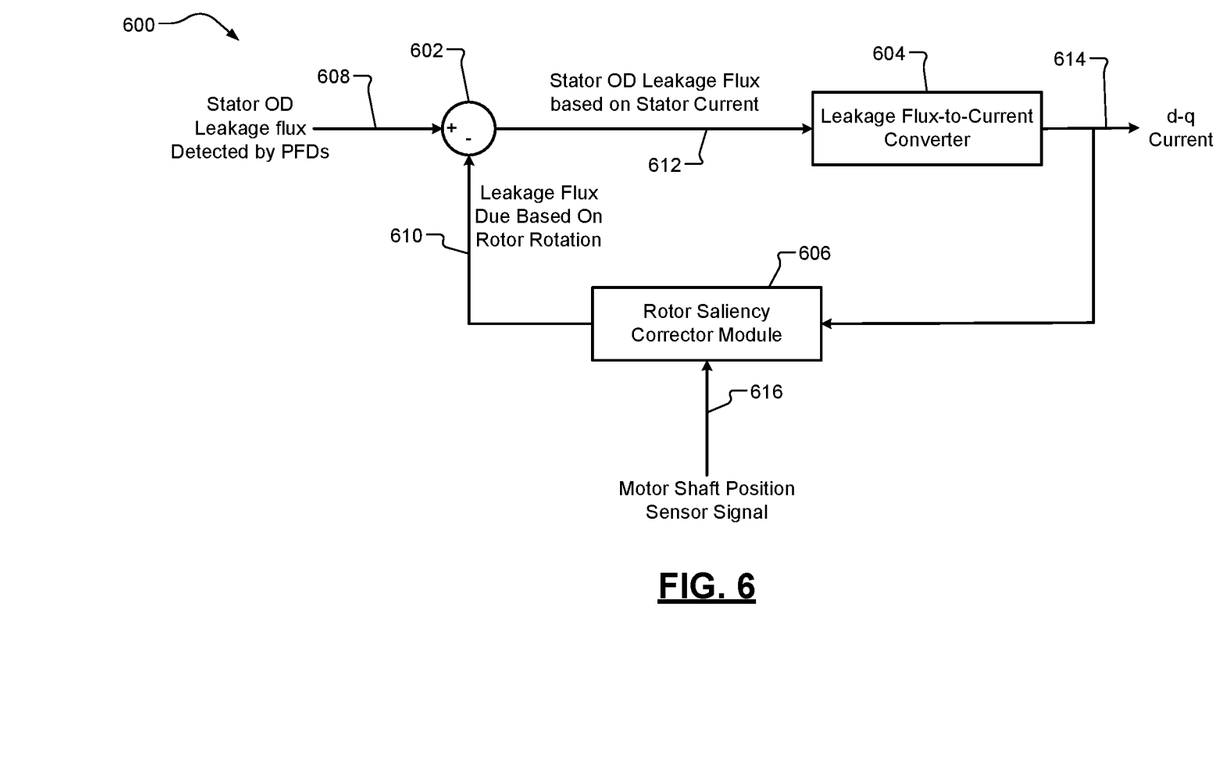
FIG. 6 is a signal diagram of an example feedback system for determining d-q current based on leakage flux detected by PFDs in accordance with the present disclosure.

FIG. 6 shows a feedback system 600 for determining d-q current based on leakage flux detected by PFDs. The feedback system 600 may be performed by the current control module 122 and/or the vehicle control module 120 of FIGS. 1-2. The feedback system 600 may include a summer 602, a leakage flux-to-current converter 604, and a rotor saliency corrector module 606. The summer 602 determines a difference 612 between leakage flux 608 detected by one or more PFDs and an expected amount of leakage flux 610 associated with rotor rotation. The leakage flux 608 may be detected at or near an outer periphery of the stator (or stator OD). The expected leakage flux 610 may include radial and tangential components of magnet flux densities Br, Bt.

The leakage flux-to-current converter 604 determines d-q current 614 based on the difference 612. The difference 612 may be leakage flux at or near the stator OD and corresponding to a level of stator current. The rotor saliency corrector module 606 determines the expected leakage flux 610 based on the d-q current 614 and a motor shaft position sensor signal 616. The motor shaft position sensor signal 616 may be indicative of rotor position, which may be indicated by a resolver.

The rotor saliency corrector module 606 provides rotor position decoupling and may compensate for different fields and d-q current levels. Motor d and q axes may have different associated reluctances resulting in different magnetic fields in different directions, which is referred to as rotor saliency. The rotor saliency corrector module 606 compensates for these differences by generating the expected leakage flux to compensate for the differences via the summer 602.

Figure 7:
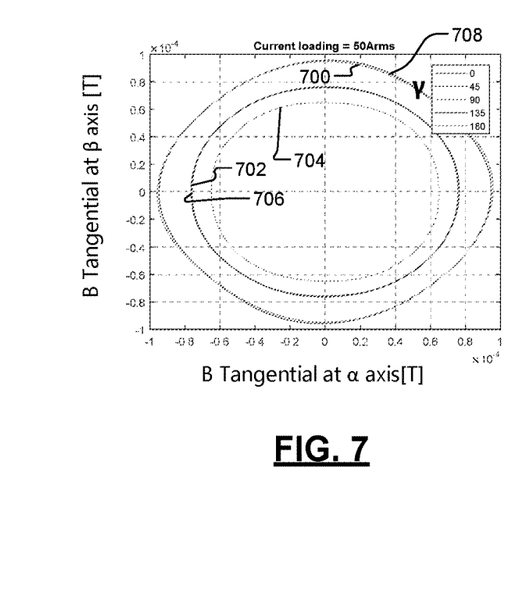
FIG. 7 is an example plot of leakage flux of space vectors for a first loading level using the feedback system of FIG. 6.
Figure 8:
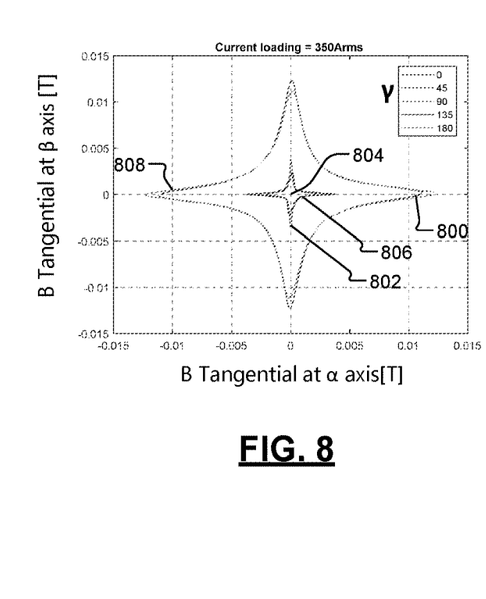
FIG. 8 is another example plot of leakage flux of space vectors for a second loading level using the feedback system of FIG. 6.
Figure 9:
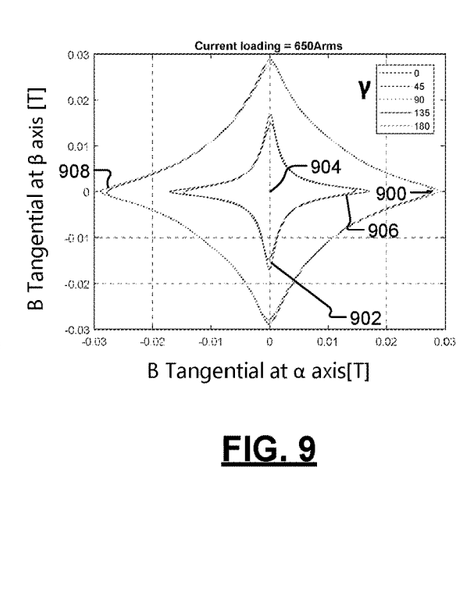
FIG. 9 is an example plot of leakage flux of space vectors for a third loading level using the feedback system of FIG. 6.

FIGS. 7-9 show plots of leakage flux of space vectors for respectively first, second and third example loading levels using the feedback system of FIG. 6. The plots are of tangential magnet flux density Bt at space vector axis β vs radial magnetic flux density Br at space vector axis α. FIG. 7 includes curves 700, 702, 704, 706, 708 for different current angles γ of 0°, 45°, 90°, 135°, 180°. FIG. 8 includes curves 800, 802, 804, 806, 808 for different current angles γ of 0°, 45°, 135°, 180°. FIG. 9 includes curves 900, 902, 904, 906, 908 for different current angles γ of 0°, 45°, 135°, 180°. FIG. 7 is a low-loading example, wherein current loading is 50 Arms. FIG. 8 is an intermediate loading example, wherein current loading is 350 Arms. FIG. 9 is a high-loading example, wherein current loading is 650 Arms.

The above-disclosed examples include PFD sensing in electric machines and include measuring and/or determining rotor states and stator states and may include performing diagnostics. The incorporated PFDs are isolated from and do not experience high voltage and current and as a result are highly reliable. The voltages and current levels experienced by the PFDs are similar to that experienced by, for example, the control modules 120, 122. The rotor states include rotor position, rotor speed (or velocity), magnetization state, and motor temperature. The motor temperature may be a temperature of the rotor. The stator states include current levels of the three phases of the motor and/or d-q current levels. The diagnostics include stator and rotor faults including faults associated with stator windings and/or permanent magnets of the rotor.

The above-described methods may include (i) physics based decoupling, (ii) observers, (iii) Kalman filters and corresponding filtering, and (iv) use of look-up tables when determining parameters based on other parameters. The above-described modules 120, 122 may include one or more neural networks that are structured and/or recursive and used to determine some parameters based on other parameters. The methods may include template based saliency tracking and image tracking.

The described examples provide a low cost and compact sensing system for any surface or interior of permanent magnet motors without need for rotor and/or stator design changes. Sensing systems are disclosed for detecting existing leakage flux on and/or near ODs of stators of electric machines using PFDs. The examples include: correlation of leakage magnetic flux with rotor positioning, rotor velocity, magnetization stator states, and temperature; correlation of leakage magnetic flux with d-q current levels; and correlation of leakage magnetic flux with stator and rotor faults and anomalies.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A propulsion system comprising:
   an electric machine disposed within a housing, the electric machine comprising
      a stator receiving current from an inverter,
      a rotor connected to and rotating a shaft based on a magnetic field generated by the stator, and
      one or more point field detectors configured to detect leakage flux within the housing,
      wherein the stator, the rotor and the one or more point field detectors are disposed within the housing;
   at least one sensor configured to detect at least one of i) current respectively for three phases of the electric machine, and ii) a position of the rotor;
   a summer configured to determine a difference between the leakage flux and an expected amount of leakage flux; and
   a control module configured to convert the difference to at least one of i) the position of the rotor, and ii) a d-q current signal, and to determine the expected amount of leakage flux based on at least one of a) the position of the rotor, and b) the d-q current signal.

2. The propulsion system of claim 1, wherein the one or more point field detectors are disposed on the rotor.

3. The propulsion system of claim 1, wherein the one or more point field detectors are disposed on the stator.

4. The propulsion system of claim 1, wherein the one or more point field detectors are disposed radially outward of the stator and radially inward of the housing.

5. The propulsion system of claim 1, wherein the one or more point field detectors are disposed on a radial outer surface of the stator.

6. The propulsion system of claim 1, wherein the one or more point field detectors are disposed on a radial inner surface of the housing.

7. The propulsion system of claim 1, wherein:
the one or more point field detectors are embedded in a dielectric material; and
the dielectric material is disposed between the stator and the housing.

8. The propulsion system of claim 1, wherein the one or more point field detectors comprise a plurality of semiconductor chip scale devices.

9. The propulsion system of claim 1, wherein the one or more point field detectors include a Hall Effect sensor that is galvanically isolated.

10. The propulsion system of claim 1, wherein the one or more point field detectors includes a magnetoresistive sensor that is galvanically isolated.

11. The propulsion system of claim 1, wherein:
the at least one sensor comprises a plurality of current sensors configured to detect the current respectively for the three phases of the electric machine;
a first converter configured to convert the difference to the position of the rotor; and
a second converter configured to determine the expected amount of leakage flux based on the position of the rotor and current signal outputs of the current sensors.

12. The propulsion system of claim 1, wherein:
the at least one sensor comprises a position sensor configured to detect the position of the at least one of the shaft or the rotor;
a converter configured to convert the difference to the d-q current signal; and
a rotor saliency corrector module configured to determine the expected amount of leakage flux (i) based on the d-q current signal and the position of the at least one of the shaft or the rotor, and (ii) while compensating for at least one of different reluctances of d and q axes of the electric machine, different magnetic fields associated with the d and q axes, or differences in d and q current levels.

13. A propulsion system comprising:
an electric machine disposed within a housing, the electric machine comprising
a stator receiving current from an inverter,
a rotor connected to and rotating a shaft based on a magnetic field generated by the stator, and
one or more point field detectors configured to detect leakage flux within the housing, the leakage flux being magnetic flux that does not follow a particular predetermined path in a magnetic circuit and is not used for work,
wherein the stator, the rotor and the one or more point field detectors are disposed within the housing; and
a first control module configured to determine one or more parameters based on the leakage flux, wherein the one or more parameters include at least one of a current level and a temperature.

14. The propulsion system of claim 13, wherein the first control module is configured to determine the current level based on the leakage flux.

15. The propulsion system of claim 13, wherein the first control module is configured to determine a rotor position based on the leakage flux.

16. The propulsion system of claim 13, wherein the first control module is configured to determine the temperature based on the leakage flux.

17. The propulsion system of claim 13, wherein the first control module is configured to determine a magnetization state based on the leakage flux.

18. The propulsion system of claim 13, wherein:
the one or more point field detectors comprise at least three point field detectors; and
the first control module is configured to determine the current level, a rotor position, the temperature, and a magnetization state based on outputs of the three point field detectors.

19. The propulsion system of claim 13, further comprising a second control module configured to perform at least one of diagnostics or prognostics of the electric machine based on the leakage flux.

20. A propulsion system comprising:
an electric machine disposed within a housing, the electric machine comprising
a stator receiving current from an inverter;
a rotor connected to and rotating a shaft based on a magnetic field generated by the stator, and
one or more point field detectors configured to detect leakage flux within the housing,
wherein the stator, the rotor and the one or more point field detectors are disposed within the housing;
a sensor separate from the electric machine and configured to detect (i) a position of the shaft, or (ii) a current level, which is an amount of current passing through a phase of the electric machine; and
a first control module configured to, based on the leakage flux, determine the at least one of the position of the shaft or the current level of the phase of the electric machine as a redundancy check to verify output of the sensor.

* * * * *